US006966518B2

(12) United States Patent
Kohlndorfer et al.

(10) Patent No.: US 6,966,518 B2
(45) Date of Patent: Nov. 22, 2005

(54) CLUTCH FOR TENSION REDUCER

(75) Inventors: Kenneth H. Kohlndorfer, Roseville, MI (US); Mark F. Gray, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 23 days.

(21) Appl. No.: 10/784,810

(22) Filed: Feb. 24, 2004

(65) Prior Publication Data

US 2005/0184184 A1 Aug. 25, 2005

(51) Int. Cl.[7] ........................ B65H 75/48; B60R 22/44
(52) U.S. Cl. .................... 242/374; 242/375; 242/375.3
(58) Field of Search ................................ 242/374, 375, 242/375.3

(56) References Cited

U.S. PATENT DOCUMENTS

| | | | | |
|---|---|---|---|---|
| 5,181,739 | A * | 1/1993 | Bauer et al. | 280/807 |
| 5,244,231 | A * | 9/1993 | Bauer et al. | 280/807 |
| 5,730,385 | A * | 3/1998 | Kopetzky et al. | 242/375.3 |
| 5,934,595 | A | 8/1999 | Kohlndorfer et al. | |
| 6,848,644 | B2 * | 2/2005 | Eberle et al. | 242/390.8 |
| 6,848,717 | B2 * | 2/2005 | Bullinger et al. | 280/806 |

* cited by examiner

*Primary Examiner*—Kathy Matecki
*Assistant Examiner*—Sang Kim
(74) *Attorney, Agent, or Firm*—Lonnie Drayer

(57) ABSTRACT

A seat belt retractor assembly has a seat belt retractor for generating a retraction force to rewind a seat belt on a reel. A coupling device selectively couples and decouples the retractor from the reel. A tensioning device generates a tensioning force in the seat belt when in an activated state. The coupling device decouples the retractor from the reel when the tensioning device is activated.

16 Claims, 5 Drawing Sheets

CLUTCH FOR TENSION REDUCER

BACKGROUND OF THE INVENTION

This invention relates to a seat belt retractor assembly.

A seat belt for a passenger vehicle often includes a seat belt retractor that retracts the seat belt to remove slack when drawn over a passenger or, alternatively, to withdraw the seat belt when no longer in use. A coil spring generally provides the necessary rewinding or retraction force for the retractor. When the seat belt is drawn over a passenger, the rewind force from the retractor typically increases. In some systems, the amount of force may be objectionable to the vehicle occupant.

Applicant has developed a tension reducing feature that reduces this rewinding force from the seat belt retractor. The details of this seat belt retractor are disclosed and hereby incorporated into this disclosure by U.S. Pat. No. 5,934,595 to Kohlndoffer, et al. Essentially, this tension reducing feature allows for a variable output of the retraction force from the seat belt retractor. One embodiment of the invention uses a cable to couple the seat belt retractor to a reel on which the seat belt is rewound. The cable itself is rewound upon a cone having varying diameters. The cone is linked to the retractor. As the seat belt is drawn out, the cable draws out the spring of the seat belt retractor. Because the cable is wound around the cone of the retractor, the retraction force may also vary.

Current seat belt systems may also include a so-called "pretensioner." The pretensioner serves to remove slack in a seat belt in the event of a vehicle accident. The pretensioner removes the slack more quickly than a seat belt retractor. A pretensioner may be located either at the belt buckle or the seat belt retractor. For example, upon the detection of a crash, a buckle pretensioner has a gas cylinder that pushes a piston. The piston is linked to the seat belt and quickly applies a tensioning force to the seat belt in the direction of the belt buckle so as to remove slack in the seat belt across the passenger.

When a pretensioner is used with a tension reducing feature, a design challenge arises. When used with a buckle pretensioner, the rapid acceleration of the retractor can cause high stress and breakage in the cable of the tension reducing feature. Moreover, when the retractor locks up during the buckle pretensioner event, the rotational momentum of the tension reducing cone may cause it to over travel and thereby induce slack in the cable, which may foul the retractor. For a retractor pretensioner, the rapid acceleration of the spool may cause the tension reducing cone to create slack in the cable and also foul the seat belt retractor.

A need therefore exists for a seat belt retractor assembly that permits tension reduction but avoids the problems that may arise when the pretensioner is activated.

SUMMARY OF THE INVENTION

Like existing seat belt retractor assemblies, the invention has a seat belt retractor that rewinds a seat belt on a reel. A tensioning device, such as a pretensioner, generates a tensioning force in the seat belt in the event of a vehicle accident. In contrast to other seat belt retractor assemblies, however, the inventive assembly has a coupling device that selectively couples and decouples the retractor from the reel. In this way, in the event of a vehicle accident, the seat belt retractor is decoupled from the seat belt system so that only the tensioning device controls movement of the seat belt. In so doing, problems of line fouling and line breakage are avoided.

The retractor has a tension reducing feature that reduces the amount of retraction force on the seat belt from the seat belt retractor. This tension reducing device may be linked to the reel for the seat belt by a cable. In addition, the tension reducing device may reduce the retraction force on the seat belt in a variable manner.

The coupling device may comprise a clutch that couples and decouples the retractor from the reel. The clutch may have a first clutch plate that selectively engages a second clutch plate. The first clutch plate is linked to the retractor while the second clutch plate is linked to the reel. A spring may bias the first clutch plate into contact with the second clutch plate.

The clutch may also comprise an overrunning clutch. The clutch decouples the retractor from the reel when the reel reaches a speed faster than the speed of the retractor. The overrunning clutch may have a first clutch plate that has teeth and a second clutch plate that has grooves to receive the teeth. The teeth decouple from the grooves when the speed of the reel exceeds the speed of the retractor. A spring may bias the first clutch plate into contact with the second clutch plate.

The invention further includes a method of controlling retraction of a seat belt. A seat belt retractor is coupled to the seat belt. The seat belt retractor generates a retraction force on the seat belt. In addition, a tensioning device is connected to the seat belt for generating a tensioning force on the seat belt in the event of a vehicle accident. The seat belt retractor is decoupled from the seat belt when the tensioning device is activated.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
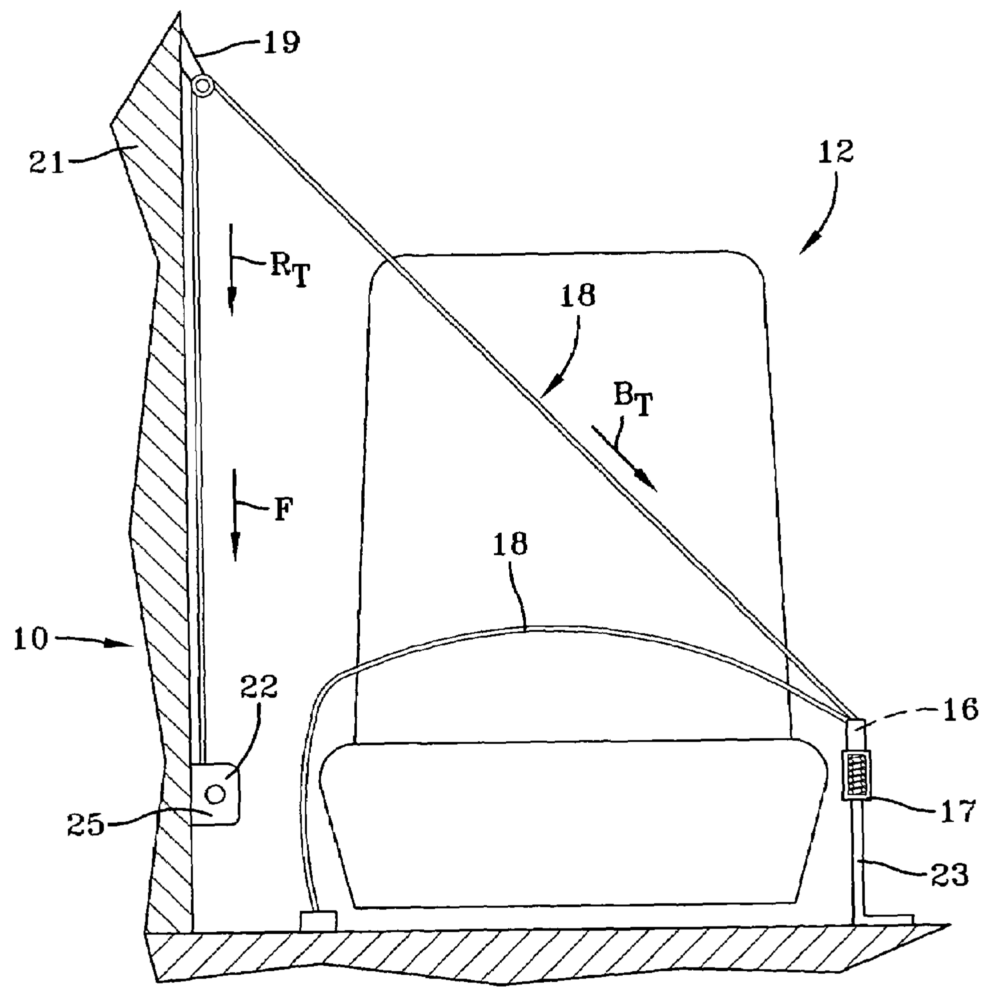
FIG. 1 illustrates the inventive seat belt retractor in a vehicle cabin.
Figure 2:
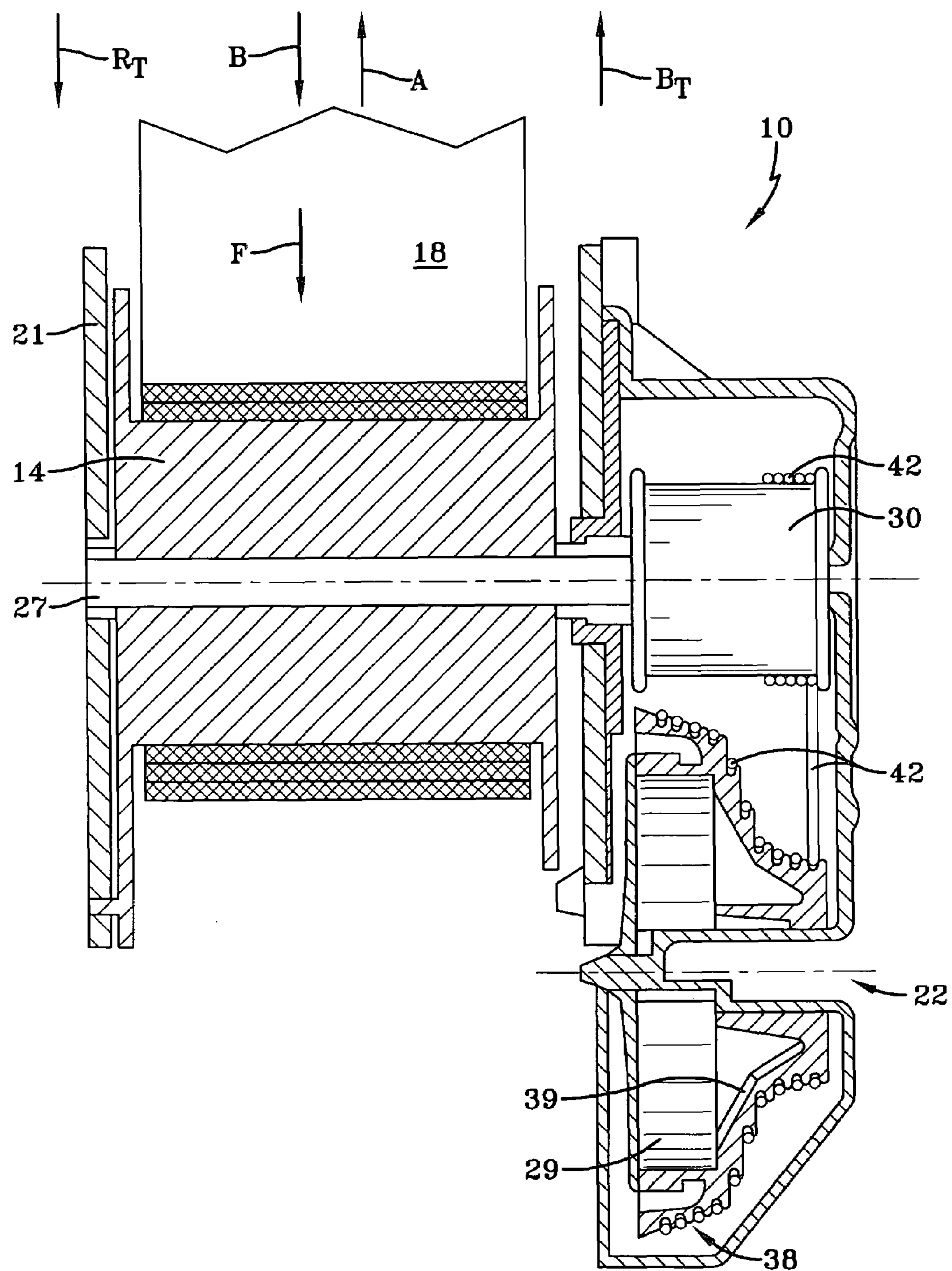
FIG. 2 illustrates the inventive seat belt assembly, showing the clutch in relation to the seat belt reel and the seat belt retractor.

FIG. 1 illustrates seat belt retractor assembly 10. Like existing seat belt retractor assemblies, seat belt retractor assembly 10 comprises seat belt retractor 22, which rewinds seat belt 18 on reel 14 as shown in FIG. 2. As shown in FIG. 1, seat belt retractor 22 is mounted to B-pillar 21 of a vehicle. As known, seat belt 18 is connected to seat belt retractor 22, turning loop 19, and seat belt buckle 17. In the event of a vehicle accident, a tensioning device, or pretensioner, removes slack between seat belt retractor 22 and seat belt buckle 17. Either buckle pretensioner 23 or seat belt retractor pretensioner 25 may be used as a tensioning device. If buckle pretensioner 23 is employed, buckle pretensioner 23 creates tensioning force BT to draw seat belt 18 in the direction shown toward seat belt buckle 17. Alternatively, in the event a retractor pretensioner is employed, retractor pretensioner 25 creates tension in the direction of $R_T$ as shown in FIG. 1 to remove slack in seat belt 18. In either case, the movement of belt 18 will be very rapid and exceed the speed that retractor 22 operates. As shown in FIG. 2, to avoid damaging retractor 22, seat belt retractor assembly 10 employs clutch 30, which decouples retractor 22 from reel 14 in the event tensioning device, either buckle pretensioner 23 or retractor pretensioner 25, is activated.

The details of the functioning of seat belt retractor assembly 10 will now be explained. With reference to FIG. 2, seat belt 18 is wound around reel 14, which is connected to pin 27 so that pin 27 rotates with reel 14. Pin 27 is linked to clutch 30. Clutch 30 is linked to retraction spring 29 through line 42. When seat belt 18 is drawn out from reel 14 in the direction of arrow A, spring 29 is compressed to create retraction force F. Retraction force F moves seat belt 18 in the direction of arrow B around reel 14 to take up seat belt slack or to return seat belt 18 to its housing. Retraction force-reducing device 38, a tension reducing device, may be used to reduce retraction force F on seat belt 18. As shown in FIG. 2, retraction force-reducing device has cone 39, which allows for variable output force of retraction spring 29 as taught by U.S. Pat. No. 5,934,595.

In the event of a vehicle accident, seat belt 18 experiences tensioning force from the pretensioner that greatly exceeds any retraction force from retraction spring 29. If the retractor pretensioner 25 is employed, seat belt 18 is accelerated with force $R_T$ in the direction of arrow B. Alternatively, in the event a buckle pretensioner is used, seat belt 18 experiences tensioning force $B_T$ in the direction of arrow A. In either instance, clutch 30 decouples movement of reel 14 from seat belt retractor 22. In this way, movement of reel 14 caused by pretensioning force, either $R_T$ or $B_T$, will not affect line 42 or retractor spring 29.

Figure 3:
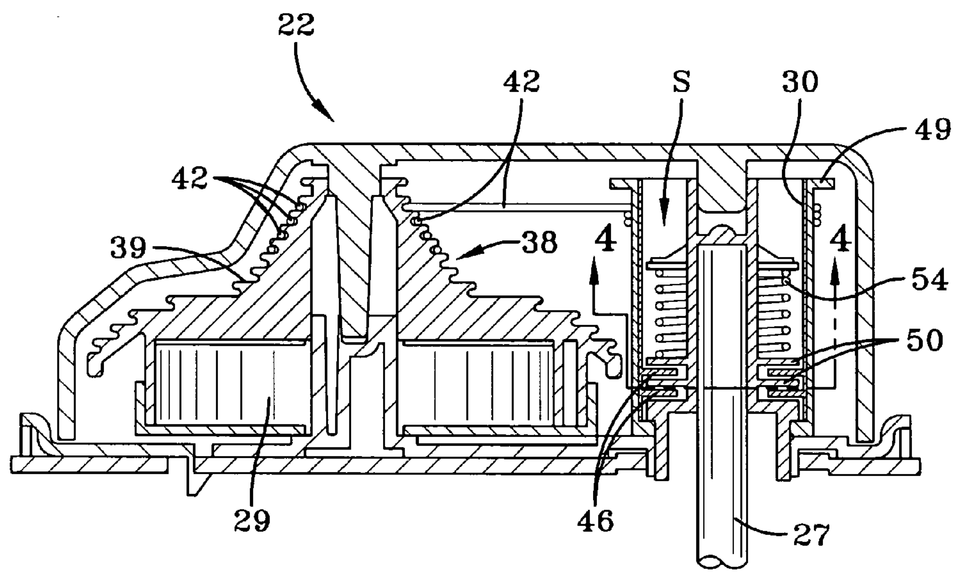
FIG. 3 illustrates a cross-sectional view of one type of clutch of the inventive seat belt retractor assembly.

The functioning of clutch 30 will now be explained with reference to FIGS. 3–7. For buckle pretensioner 23, clutch 30 may comprise first clutch plate 46, which is mechanically linked to retractor 22 through line 42. As shown in FIG. 3, retractor clutch plates 46 are part of spindle 49, upon which line 42 is wound and linked to spring 29 through cone 39. Reel clutch plates 50 are rotationally linked to pin 27, which is rotationally linked to reel 14 as shown in FIG. 2. Reel clutch plates 50 are compressed onto retractor clutch plates 46 by spring 54.

Figure 4:
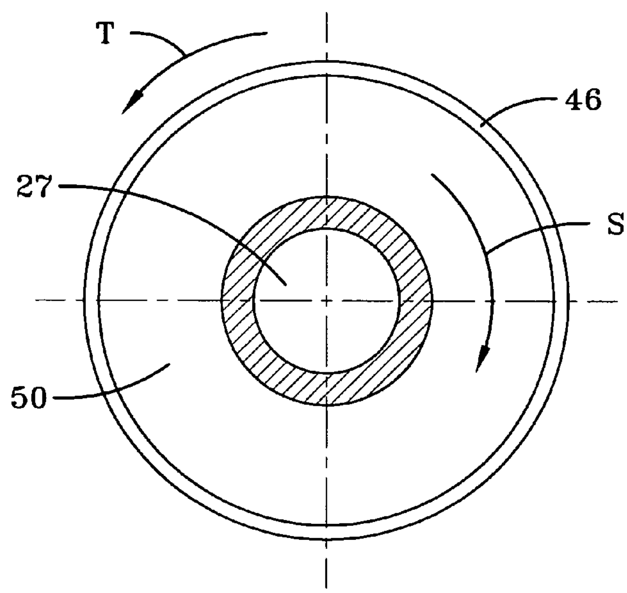
FIG. 4 illustrates clutch plates of the clutch of FIG. 3.

As shown in FIG. 4, during normal seat belt retraction operation, retractor clutch plates 46 will rotate at the same speed and same direction T as reel clutch plate 50, thereby coupling reel 14 to retractor 22. However, in the event buckle pretensioner 23 activates, reel clutch plates 50 will rotate in direction S while retractor clutch plates 46 will rotate in direction T, a direction opposite of S. This is so because buckle pretensioner 23 will pull seat belt 18 in an opposite direction of retractor 22. Consequently, reel clutch plates 50 will slip with respect to retractor clutch plates 46 to thereby decouple reel 14 from retractor 22. Accordingly, line 42 will not foul and cone 39 will not over spin.

Figure 5:
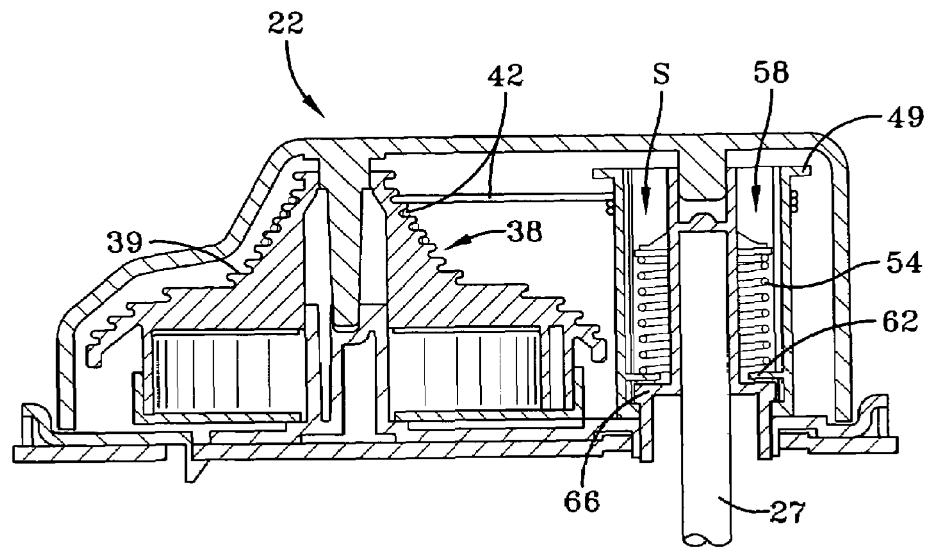
FIG. 5 illustrates a side cross-sectional view of another type of clutch of the inventive seat belt retractor assembly.
Figure 6:
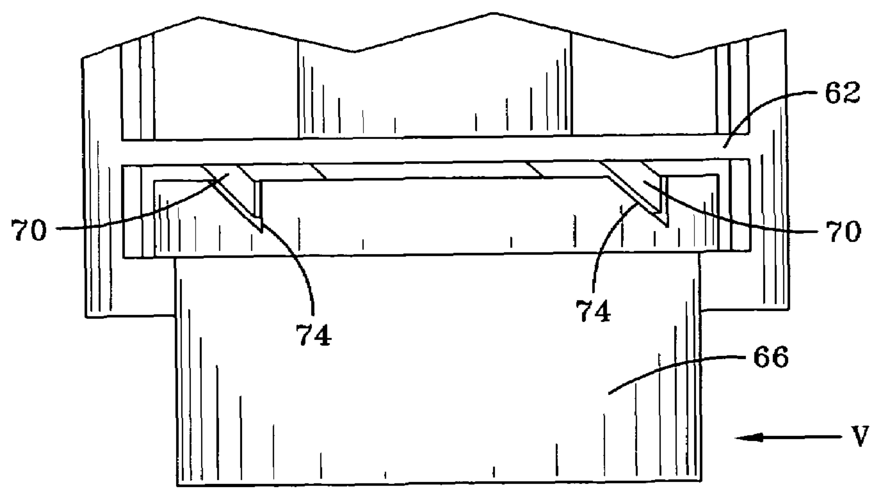
FIG. 6 illustrates a close up view of clutch plates of the clutch of FIG. 5.
Figure 7:
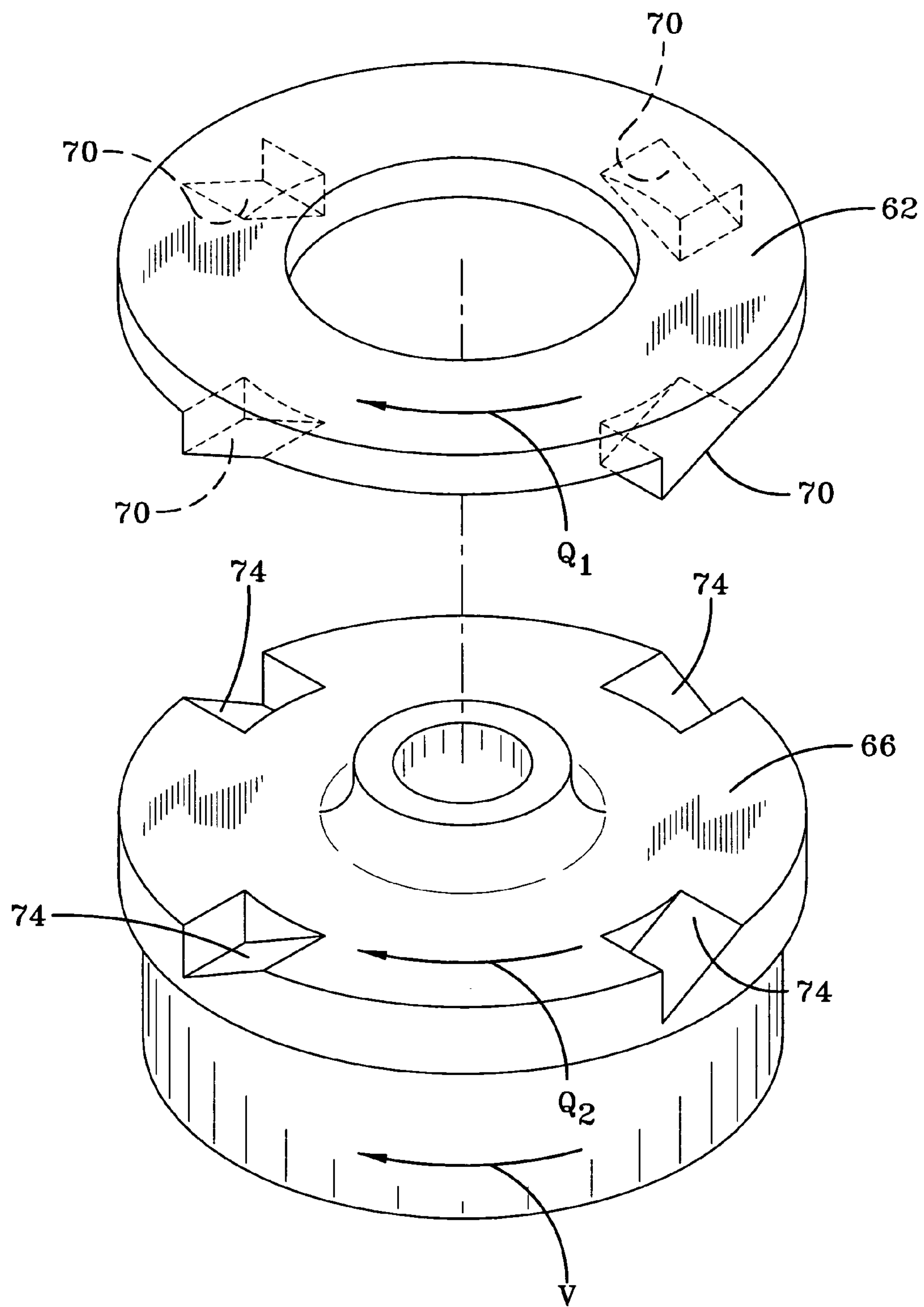
FIG. 7 illustrates an exploded perspective view of the inventive clutch plates of FIGS. 5 and 6.

Alternatively, in the event retractor pretensioner 25 is employed, it is preferable to use one way overrunning clutch 58 as shown in FIGS. 5–7. Overrunning clutch 58 comprises first clutch plate 62 and second clutch plate 66. First clutch plate 62 has teeth 70, shaped like ramps extending around its periphery as shown in FIG. 7. In addition, for each tooth 70, second clutch plate 66 has ramp-shaped grooves 74, which are sized to receive teeth 70. Spring 54 applies spring force S to put first clutch plate 62 into contact with second clutch plate 66.

During normal operation, both first clutch plate 62 and second clutch plate 66 rotate in the direction of arrow V as shown in FIGS. 6 and 7 at the same speed, $Q_1$. In the event pretensioner 25 is activated, belt 18 is drawn in the direction of arrow B and causes reel 14 as well as second clutch plate 66 to rotate at speed, $Q_2$, a speed greater than $Q_1$. As shown in FIGS. 6 and 7, second clutch plate 66 rotates at speed $Q_2$ while first clutch plate 62 tends to rotate at a lower speed, $G_1$. Consequently, first clutch plate 62 slips from second clutch plate 66 to thereby decouple seat belt retractor 22 from reel 14.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

We claim:

1. A seat belt retractor assembly comprising:
- a reel for a seat belt;
- a seat belt retractor for generating a retraction force to rewind the seat belt on said reel;
- a coupling device for selectively coupling and decoupling said retractor to said reel, said coupling device comprising an overrunning clutch for selectively coupling and decoupling said retractor from said reel; and
- a tensioning device for generating a tensioning force in the seat belt when in an active state, said coupling device decoupling said retractor from said reel when said tensioning device is in said active state and a first speed of said reel exceeds a second speed of said retractor.

2. The seat belt retractor assembly of claim 1 wherein said retractor has a retraction force-reducing device, said retraction force-reducing device for reducing the retraction force on the seat belt from said retractor.

3. The seat belt retractor assembly of claim 2 wherein said retraction force-reducing device is linked to said reel by a line.

4. The seat belt retraction assembly of claim 2 wherein said retraction force-reducing device variably reduces the retraction force.

5. The seat belt retractor assembly of claim 1 wherein said clutch comprises a first clutch plate for selectively engaging a second clutch plate, said first clutch plate linked to said retractor and said second clutch plate linked to said reel.

6. The seat belt retractor assembly of claim 5 including a spring for biasing said first clutch plate into contact with said second clutch plate.

7. The seat belt retractor assembly of claim 1 wherein said overrunning clutch comprises a first clutch plate and a second clutch plate, said first clutch plate having teeth and said second clutch plate having grooves to receive said teeth, said teeth decoupling from said grooves when said first speed exceeds said second speed.

8. The seat belt retractor assembly of claim 7 including a spring for biasing said first clutch plate into contact with said second clutch plate.

9. A seat belt retractor assembly comprising:

a reel for a seat belt;

a seat belt retractor for generating a retraction force to rewind the seat belt on said reel;

a retraction force-reducing device for reducing the retraction force of said seat belt retractor, said retraction force-reducing device linked to said retractor;

an overruning clutch for selectively coupling and decoupling said retractor to said reel when a first speed of said reel exceeds a second speed of said retractor; and a tensioning device for generating a tensioning force in the seat belt when in an active state, said clutch decoupling said retractor from said reel when said tensioning device is in said active state.

10. The seat belt retractor assembly of claim 9 wherein said retraction force-reducing device links said retractor to said reel by a line.

11. The seat bell retraction assembly of claim 9 wherein said retraction force-reducing device variably reduces the retraction force.

12. The seat belt retractor assembly of claim 9 wherein said clutch comprises a first clutch plate for selectively engaging a second clutch plate, said first clutch plate linked to said retractor and said second clutch plate linked to said reel.

13. The seat belt retractor assembly of claim 12 including a spring for biasing said first clutch plate into contact with said second clutch plate.

14. The seat belt retractor assembly of claim 9 wherein said overrunning clutch comprises a first clutch plate and a second clutch plate, said first clutch plate having teeth and said second clutch plate having grooves to receive said teeth, said teeth decoupling from said grooves when said first speed exceeds said second speed.

15. The seat belt retractor assembly of claim 14 including a spring for biasing said first clutch plate into contact with said second clutch plate.

16. The seat belt retractor assembly of claim 9 wherein said clutch is linked to said reel and said retraction force-reducing device.

* * * * *